United States Patent
Davidson et al.

(10) Patent No.: US 9,032,412 B1
(45) Date of Patent: May 12, 2015

(54) RESOURCE ALLOCATION BASED ON ACTIVE FOLDER ACTIVITY

(75) Inventors: Troy T. Davidson, Clinton, UT (US); Brian R. Gruttadauria, Sutton, MA (US); Joseph T. Frank, Louisville, CO (US)

(73) Assignee: Lenovoemc Limited, Hong Kong (HK)

( * ) Notice: Subject to any disclaimer, the term of this patent is extended or adjusted under 35 U.S.C. 154(b) by 838 days.

(21) Appl. No.: 12/651,360

(22) Filed: Dec. 31, 2009

(51) Int. Cl.
*G06F 9/44* (2006.01)

(52) U.S. Cl.
CPC .................................. *G06F 9/4443* (2013.01)

(58) Field of Classification Search
None
See application file for complete search history.

(56) References Cited

U.S. PATENT DOCUMENTS

| | | | |
|---|---|---|---|
| 5,623,600 A | 4/1997 | Ji et al. | |
| 5,625,818 A | 4/1997 | Zarmer et al. | |
| 5,889,943 A | 3/1999 | Ji et al. | |
| 6,108,687 A | 8/2000 | Craig | |
| 6,389,427 B1 | 5/2002 | Faulkner | |
| 6,553,378 B1 | 4/2003 | Eschelbeck | |
| 6,560,639 B1 | 5/2003 | Dan et al. | |
| 6,654,746 B1 | 11/2003 | Wong et al. | |
| 7,540,027 B2* | 5/2009 | Achanta et al. | 726/22 |
| 7,962,032 B2* | 6/2011 | Lim | 396/213 |
| 8,477,228 B2* | 7/2013 | Stallings et al. | 348/333.05 |
| 2002/0174139 A1 | 11/2002 | Midgley et al. | |
| 2003/0028587 A1 | 2/2003 | Driscoll et al. | |
| 2003/0115022 A1 | 6/2003 | Hamilton et al. | |
| 2004/0034671 A1 | 2/2004 | Kodama | |
| 2004/0128355 A1 | 7/2004 | Chao et al. | |
| 2004/0181691 A1 | 9/2004 | Armingaud et al. | |
| 2005/0091184 A1* | 4/2005 | Seshadri et al. | 707/1 |
| 2005/0091674 A1 | 4/2005 | Knight et al. | |
| 2005/0289354 A1 | 12/2005 | Borthakur et al. | |
| 2006/0195411 A1 | 8/2006 | Knight et al. | |
| 2006/0241994 A1* | 10/2006 | Anand et al. | 705/8 |
| 2008/0010319 A1 | 1/2008 | Vonarburg et al. | |
| 2008/0082688 A1 | 4/2008 | Yi et al. | |
| 2008/0090598 A1 | 4/2008 | Fanelli et al. | |
| 2008/0133706 A1 | 6/2008 | Chavez et al. | |
| 2008/0222295 A1 | 9/2008 | Robinson et al. | |
| 2008/0275960 A1 | 11/2008 | Myllyla et al. | |
| 2008/0313639 A1* | 12/2008 | Kumar et al. | 718/104 |
| 2009/0059314 A1* | 3/2009 | Liao | 358/474 |
| 2009/0157513 A1 | 6/2009 | Bonev et al. | |
| 2009/0259588 A1* | 10/2009 | Lindsay | 705/40 |
| 2010/0017404 A1* | 1/2010 | Banerjee et al. | 707/6 |
| 2010/0017810 A1 | 1/2010 | Clewley et al. | |
| 2010/0070899 A1 | 3/2010 | Hunt et al. | |
| 2010/0185698 A1 | 7/2010 | Lee et al. | |
| 2011/0047182 A1 | 2/2011 | Shepherd et al. | |

OTHER PUBLICATIONS

Adam Pash, "Automatically upload a folder's photos to Flickr", May 22, 2007, lifehacker.com, 6 pages.

(Continued)

*Primary Examiner* — Eric C Wai
(74) *Attorney, Agent, or Firm* — John L. Rogitz; John M. Rogitz (57) ABSTRACT

A method, article of manufacture, and apparatus for allocating resources in a computer system is disclosed. In some embodiment, this comprises monitoring application activity triggered by an active folder, ranking applications based on the monitored activity, and allocating resources to applications based on the ranking. In some embodiments, a higher ranked application is allocated more resources.

18 Claims, 7 Drawing Sheets

(56) References Cited

OTHER PUBLICATIONS

Troy T. Davidson, Brian R. Gruttadauria, Joe Frank, "Active Folders", File History of co-pending U.S. Appl. No. 12/651,349, filed Dec. 31, 2009.
Troy T. Davidson, Brian R. Gruttadauria, Joseph T. Frank, "Centraolized File Action Based on Active Folders", File History of co-pending U.S. Appl. No. 12/651,354, filed Dec. 31, 2009.
Troy T. Davidson, Brian R. Gruttadauria, Joseph T. Frank, "Active Folders", final office action from related pending U.S. Appl. No. 12/651,349 dated Jan. 10, 2014.
Hitek Software Home, "When New Files Come Into Folders, Send Email and Attach These Files", dated Jul. 22, 2007. http://www.hiteksoftware.com/knowledge/caseStudies/013.htm.
Samer Kurdi, "Dropsize: resize images by dragging them to a special folder" dated Oct. 14, 2009, http://www.freewaregenius.com/dropsize-resize-images-by-dragging-them-to-a-special-folder/.
Troy T. Davidson, Brian R. Gruttadauria, Joseph T. Frank, "Active Folders", applicants response and amendment to final office action from related pending U.S. Appl. No. 12/651,349, filed Feb. 28, 2014.
Troy T. Davidson, Brian R. Gruttadauria, Joseph T. Frank, "Active Folders", non-final office action from related pending U.S. Appl. No. 12/651,349 dated May 1, 2014.
Troy T. Davidson, Brian R. Gruttadauria, Joseph T. Frank, "Active Folders", applicants response to non-final office action from related pending U.S. Appl. No. 12/651,349, filed Jul. 2, 2014.
Troy T. Davidson, Brian R. Gruttadauria, Joseph T. Frank, "Active Folders", appeal brief filed Jul. 2, 2014 in response to the non-final office action from related pending U.S. Appl. No. 12/651,349 dated May 1, 2014.
Troy T. Davidson, BrianR. Gruttadauria, Joseph T. Frank, "Centralized File Action Based on Active Folders", related U.S. Appl. No. 12/651,354, Non-Final Office Action dated Feb. 25, 2015.
Troy T. Davidson, Brian R. Gruttadauria, Joseph T. Frank, "Centralized File Action Based on active Folders" related U.S. Appl. No. 12/651,354 non-final office action dated Feb. 26, 2015.
Troy T. Davidson, Brian R. Gruttadauria, Joseph T. Frank, "Centralized File Action Based on active Folders" related U.S. Appl. No. 12/651,354 applicants response to the non-final office action filed Mar. 5, 2015.

\* cited by examiner

RESOURCE ALLOCATION BASED ON ACTIVE FOLDER ACTIVITY

CROSS REFERENCE TO RELATED APPLICATIONS

This application is related to co-pending U.S. patent application Ser. No. 12/651,354 for CENTRALIZED FILE ACTION BASED ON ACTIVE FOLDERS and filed concurrently herewith, which is incorporated herein by reference for all purposes; and co-pending U.S. patent application Ser. No. 12/651,349 for ACTIVE FOLDERS and filed concurrently herewith, which is incorporated herein by reference for all purposes.

FIELD OF THE INVENTION

The present invention relates generally to data systems, and more particularly, to systems and methods of efficiently processing information.

BACKGROUND OF THE INVENTION

Information technology has advanced tremendously in recent years. Storage capacity has increased exponentially, broadband internet access is more accessible than ever, digital cameras and camcorders are producing increasingly higher quality pictures and videos, and the smartphone is replacing the PC in many aspects. With such advances, users are now able to obtain a vast amount of data from almost anywhere, and retain that data.

Unfortunately, this vast amount of data puts a strain on many applications. Applications now need to sift through large storage devices and data systems in order to find relevant information—a process that is becoming more resource intensive and time consuming.

There is a need, therefore, for an improved method, article of manufacture, and apparatus for processing information.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data system configured to store files, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Today, conventional implementations of storage systems is to provide mechanisms where individual applications request data from the storage system indicating when files or data objects are acted upon. For example, if a word processing application wanted to know when a specific word processing document was last modified, the word processing application would have to request that data from the storage system. This conventional approach leaves no centralized location for applications to monitor file actions, and requires applications to monitor the storage system for such file events. The enhanced techniques described herein improve the storage system by implementing a central location for watching files and execution of actions based on predefined or user configured policies.

To improve the storage system, active folders may be used. Active folders are folders with attributes that are associated with the storage, modification, or deletion of files in the folder. An active system, which executes actions based on the file events in the active folder, may also be used.

Figure 1:
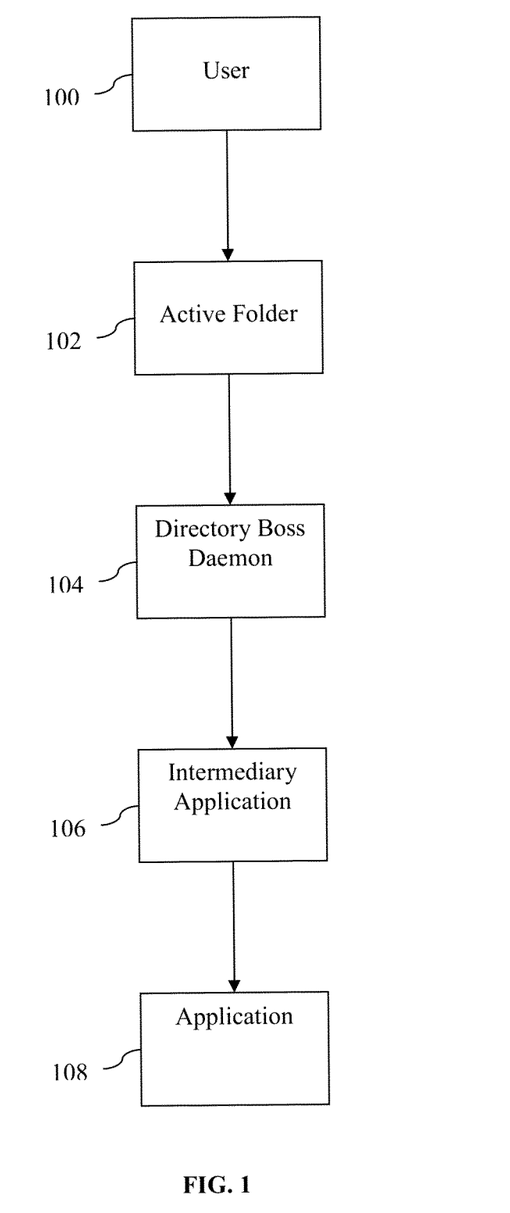
FIG. 1 is a flowchart of a method in accordance with some embodiments.

FIG. 1 illustrates an embodiment. User 100 places a file in Active Folder 102. Directory Boss Daemon 104 is configured to watch Active Folder 102 for file events based on Active Folder 102's attributes. If a triggering file event is detected, then Directory Boss Daemon 104 will execute Intermediary Application 106. Intermediary Application 106 is configured to interface with Application 108 and perform actions as defined by User 100 or by policy. Though FIG. 1 illustrates each component being separate, some or all of the components may be in a single device. For example, Active Folder 102 may reside in User 100's machine. Directory Boss Daemon 104 and Command Line Application 106 may also reside in User 100's machine. Application 108 may reside on a machine remote from User 100, such remote machine may include services providing internet services. Further, Intermediary Application 106 may be a command line application, though other applications and methods for performing the defined actions are suitable.

Figure 2:
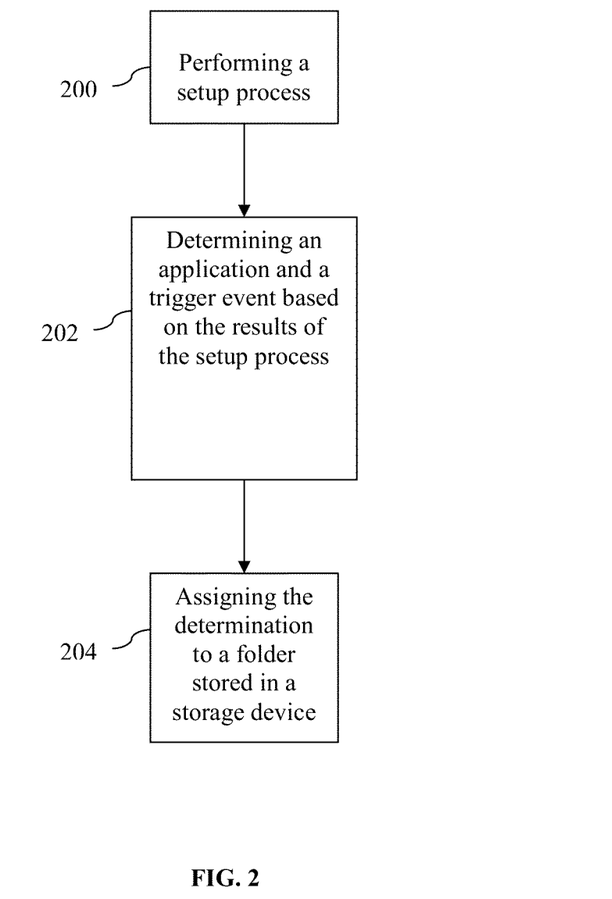
FIG. 2 is a flowchart of a method to store information in accordance with some embodiments.

FIG. 2 illustrates a method to set up an active folder. In step 200, a set up phase is performed. This may include gathering login information, such as email account information, email account password, facebook account information, administrator password for password protected applications, etc. This may also include gathering file trigger information, such as which file events (e.g. modification, creation, deletion, etc.) will trigger a directory boss daemon, which file types (.doc, .jpg, etc.), resize information, among others. The triggering file event need not be determined by a user. In some embodiments, policies or other predetermined file events may be used. Multiple trigger events may be determined, as well as multiple applications and multiple intermediary applications. In step 202, based on the results of the setup phase, an application and a trigger event are determined. In some embodiments, an intermediary application, such as a command line application may be determined. For example, a command line application with resize dimensions may be determined if resize information was provided in the setup phase. In step 204, the determined application and trigger event are assigned to a folder stored in a storage device. An authentication process may also be performed to confirm the validity of login information.

In some embodiments, a user may wish to have an active folder which emails a file whenever a file is moved to or created in the folder. A user may create a folder named "Email." Attributes may be added to the folder, such that a file creation event triggers a directory boss daemon, but not other file events (e.g. deletion, modification, etc.). For example, moving a .jpg file into the Email folder would result in triggering a directory boss daemon, but deleting a file would not. File events may further be defined to include only a particular set of file types. For example, creating a .jpg may result in triggering a directory boss daemon, but creating an .xls document may not. Attributes may also include email account information, such as username, password, email service provider (MS Exchange, web email provider, etc.), and recipients, among others. The directory boss daemon may be configured to execute an intermediary application, such as a command line application, plug-in or other suitable application, which interfaces with the email service provider and sends an email to the recipients with the created file attached. After the email has been sent, a log may be recorded. Such a log may include information such as "email sent", "login failed", "non-existent recipient," and "file attachment too large," among others. The log may also be used to record the history of the active folder, such as total number of files sent via email, total size of email attachments, etc. This provides many benefits over conventional methods of attaching files to email. Conventionally, a user would have to login to an email service provider, locate a file, upload the file to the email service provider, and send the email. Subsequent attachments would again involve logging in, locating a file, uploading the file, and sending the email. With the enhanced technique described herein, a user simply moves a file into an active folder, and the system may automatically send the file as an attachment. Subsequent attachments would only involve adding more files to the active folder.

The above example illustrates only one of many combinations of attributes, directory boss daemons, email service providers, and intermediary applications. Directory boss daemons may be configured to detect several file types (.doc, .mpg, .mp3, etc.) and several file events (creation, rename, modification, access, deletion, etc.). Intermediary applications may send an email with the relevant file attached, may send a simple email notifying the recipients that the relevant file was modified, created, deleted, etc., or may email a link to the file, among others.

Figure 5:
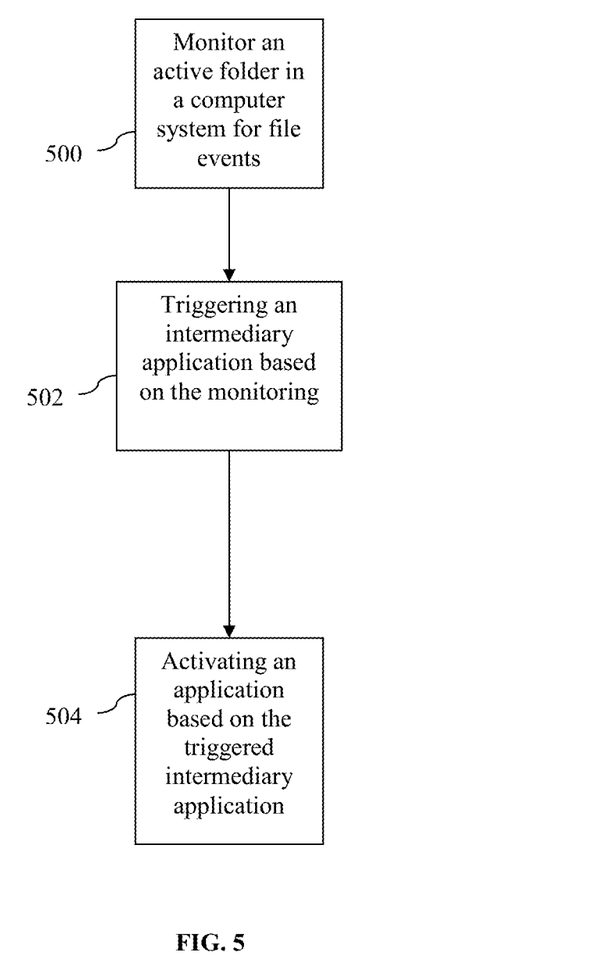
FIG. 5 is a flowchart of a method to automate application activity in accordance with some embodiments.

FIG. 5 illustrates a method to automate application activity in some embodiments. In step 500, an active folder in a computer system is monitored for file events. In step 502, an intermediary application is triggered based on the monitoring. In step 504, an application is activated based on the triggered intermediary application.

Active Folders may also contain subfolders. Using the example above, separate subfolders may be used for different email recipients, or for different types of files. Different subfolders may also have different triggering events. For example, one active folder may contain many files, and a triggering event may be modification or deletion. If any file in the active folder was deleted or modified, an email notification may go out to the recipient list associated with the active folder. Another active folder may have a file creation triggering event. If any file was moved to the folder or created in the folder, an email may go out to the recipients associated with the active folder, and the file created may be attached to the email.

Active Folders are not limited to email applications. A wide variety of applications may be utilized. For example, an application may be the social networking site Facebook. The attributes for an active folder named "Facebook" may be similar to those of an email attributes (e.g. file event trigger may be file creation, .jpg files may be monitored for, etc.). However, instead of directing a command line application to an email provider, the command line application is directed to a user's Facebook account. The login information for the Facebook account will be required for access, similar to the email active folder. If a picture file is moved to the Facebook active folder, it may trigger a directory boss daemon. The director boss daemon would execute a command line application resulting in the picture file to be uploaded to the user's Facebook account utilizing the login information.

Figure 4:
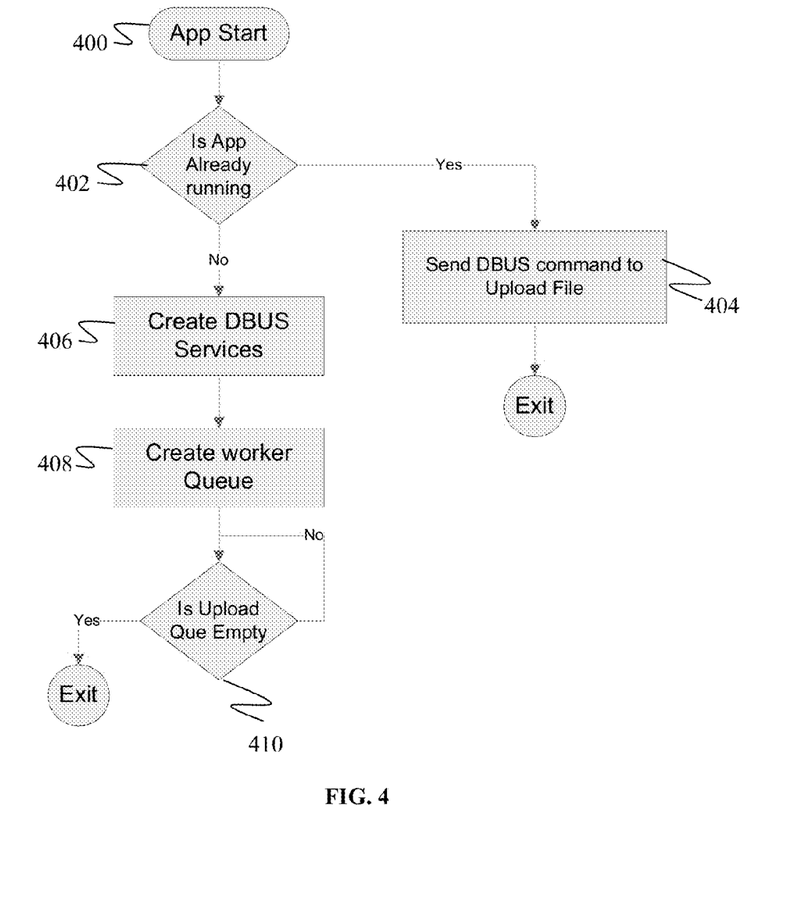
FIG. 4 is a flowchart of a method to upload files in accordance with some embodiments.

FIG. 4 illustrates a method to upload pictures to Facebook using a command line application in some embodiments. In step 400, the command line application starts. In step 402, it is determined if the command line application is already running. If yes, the flowchart proceeds to step 404, sending DBUS command to upload the file (e.g. picture). If no, the flowchart proceeds to step 406, create DBUS services. In step 408, a worker queue is created. In step 410, it is determined if the queue is empty. If yes, the command line application exits. If not, the command line application continues to upload files until the queue is empty. In some embodiments, the command line application may be written as a C++ application derived from a common base code that provides the DBUS services and work queue. The command line application may also execute applet scripts written in PHP for applications such as Facebook.

Other websites may be used for sharing photos. For example, Flickr may be used, or Picasa provided by Google may be used, among others. Like Facebook, these websites generally require an account and password to utilize their services. The active folders uploading to these websites may require such information during the set up phase.

Many types of files may be used in active folders. For example, active folders may respond to video files (.mpg, .avi, etc.), sound files (.mp3, .wav, etc.), word processing files (.doc, .txt, etc.), among others. When set to respond to video files, active folders may not want to use email as a method to send video files. This may be due to bandwidth concerns. Instead, active folders may be set up to upload video files to YouTube, or other websites. By uploading video files to such websites, a user may share the video with a much wider audience than email would reach. Similar to the Facebook and email examples illustrated above, a YouTube account will be necessary to upload and share video files. An active folder setup phase for YouTube will include asking for account name and password. The login information may be used by the directory boss daemon or the command line application once a video file is detected (e.g. created, modified, etc. depending on triggering policy) in the YouTube active folder.

Active folders need not be limited to web services. For example, an application may be a photo resize application. The attributes for an active folder named "Resize" may be similar to the Facebook active folder (e.g. file event trigger may be file creation, picture files may be monitored for, etc.). The command line application may be directed toward a photo editing program, such as Microsoft Paint, a java applet, or the command line application may do the resize itself. In some embodiments, the following parameters may be used in the command line application.

| ResizePhoto [options and their Parameters][filename] | |
|---|---|
| −w [path to watermark file] | The File name of the watermark file |
| −x [width] | the width |
| −y [height] | the height |
| −o [output] | the output file name |
| Filename | The name of the file to resize |

Though the above illustrates a command line application, other applications, such as plugins, among others, are equally suitable.

Figure 3A:
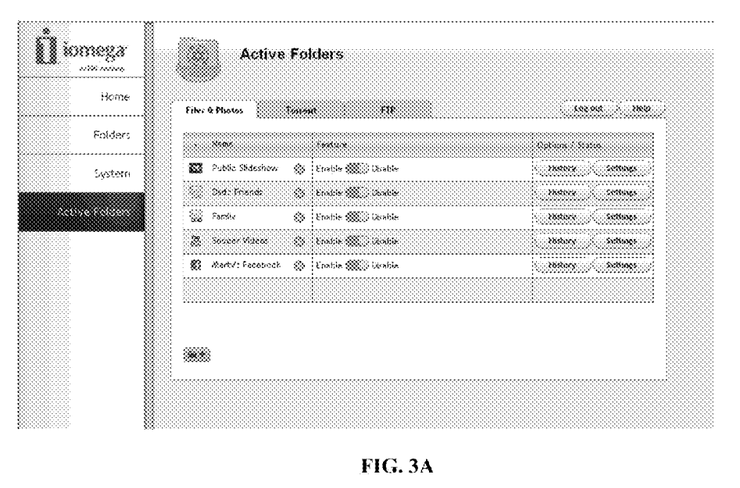
FIGS. 3A-3C are screen shots of a method to create an active folder in accordance with some embodiments.
Figure 3B:
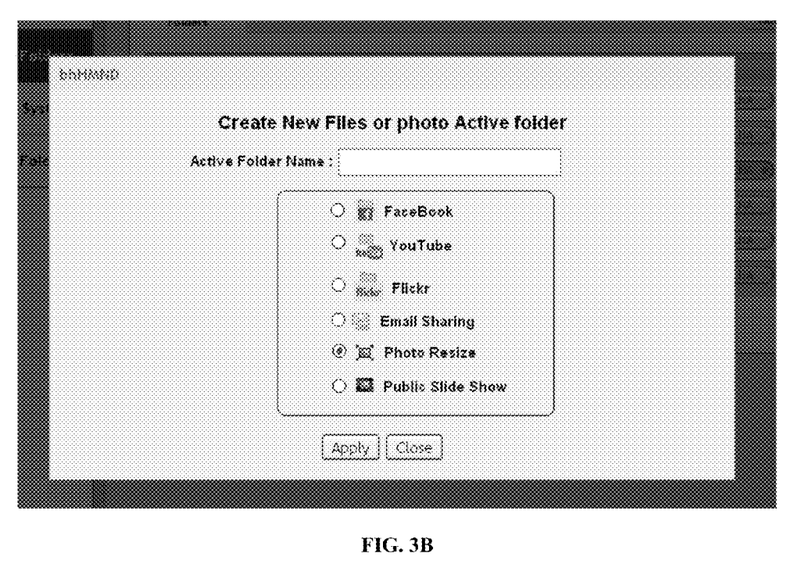
Figure 3C:
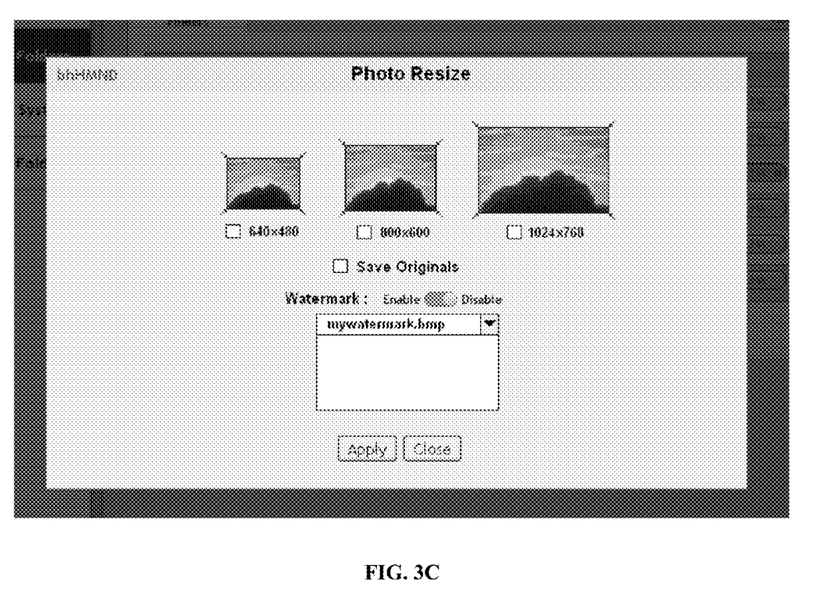

FIGS. 3A-3C illustrate a method to resize photos using the Iomega Home Media, a product available from Iomega Corporation. In FIG. 3A, a user may create a new active folder by clicking the create button, which is located on bottom left of the active folder tab and "files and photos" sub tab. FIG. 3B illustrates a sample screen shot after the create button has been clicked in FIG. 3A. After selecting the resize photo option in FIG. 3B and naming the folder, FIG. 3C illustrates a screen shot allowing a user to specify dimensions of the resize and watermark. While FIGS. 3A-3C illustrate a few applications associated with active folders, many applications may be used. For example, different web sites (e.g. Picasa, other video sites, etc.) may be used. Further, applications may be used, such as virus scan programs, MS Paint, etc.

Instead of login information, photo resize dimensions may be used. For example, the attributes of 800×600 may indicate that all pictures in the "Resize" folder should have dimension of 800×600. If a picture was created with dimensions smaller than 800×600, the picture may be stretched to meet the required dimensions. Similarly, if a picture was created with dimensions larger than 800×600, the picture may be truncated or compressed to meet the required dimensions.

Other applications may include virus scans, among others. For example, an active folder may have attributes indicating that a virus scan should be performed on a file once it is created or moved to the folder. The attributes may also indicate that a virus scan should be performed daily on all files in the folder.

Active folders may also be used to provide feedback to applications or servers. For example, if an active folder reported high activity and another active folder reported low activity, a server may be configured to allocate more resources (bandwidth, ports, processing power, etc.) to the high activity folder. The levels of activity may be recorded in a log. Applicants may also be ranked according to activity. For example, if a user creates many pictures in the Facebook active folder, but does not put as many videos in the YouTube folder or as many files in a virus scan folder, Facebook may be given a higher rank than YouTube or virus scan. This rank may be used to determine resource allocation to the respective applications, such as processing power, bandwidth, placement on a Windows Start Menu shortcut list, placement in a favorites list in a web browser, etc.

Figure 6:
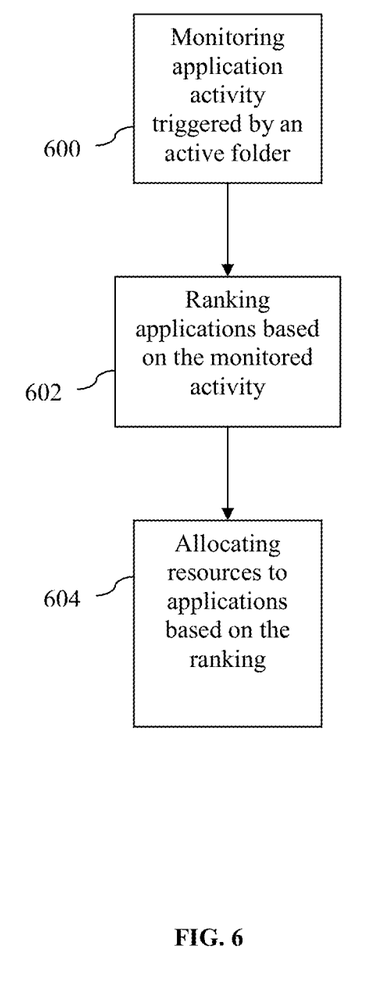
FIG. 6 is a flowchart of a method to allocate system resources in accordance with some embodiments.

FIG. 6 illustrates a method to allocate resources in a computer system in some embodiments. In step 600, application activity triggered by an active folder is monitored. In step 602, applications are ranked based on the monitored activity. In step 604, resources are allocated to applications based on the ranking.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method, comprising:
monitoring activity at an active folder;
responsive to a determination that a first activity has been performed on a file in the active folder, automatically sending the file to an account associated with the active folder, the account accessible with a name and password, the first activity being selected from the group consisting of: a file addition to the active folder, a file deletion from the active folder, a file access in the active folder, a file rename in the active folder, or a file modification in the active folder;
responsive to a determination that a second activity different from the first activity has been performed on a file in the active folder, not automatically sending the file to the account, such that the account receives the file automatically responsive to the first activity being performed on the file but not responsive to the second activity being performed on the file, the second activity being selected from the group consisting of: a file addition to the active folder, a file deletion from the active folder, a file access in the active folder, a file rename in the active folder, or a file modification in the active folder, provided the second activity is different from the first activity;
responsive to the performance of at least one of the first activity and the second activity, ranking plural applications associated at least with the file and allocating resources to the applications based on the ranking, wherein allocating resources to the applications based on the ranking includes allocating more resources to applications with a higher rank, and wherein allocating more resources to applications with a higher rank includes giving the higher ranked application a higher placement in a web browser list.

2. The method of claim 1, wherein the account is an email account, and wherein the method further comprises sending, to the email account, the file in an email as an attachment.

3. The method of claim 1, wherein the account is a social networking account and the file is a photograph, and wherein the method further comprises sending, to the social networking account, the photograph by uploading the photograph to the social networking account.

4. The method of claim 1, wherein the account is a video sharing account and the file is a video, and wherein the method further comprises sending, to the video sharing account hosted by a video sharing service, the video by uploading the video to the video sharing account, the video sharing service storing videos for video sharing accounts.

5. The method of claim 1, wherein the first activity is associated with a file of a first type and the second activity is associated with a file of a second type different from the first type, the first and second activities both being implemented at the same active folder.

6. The method of claim 1, wherein the account is a first account, wherein the first activity is implemented on a first subfolder of the active folder and a third activity is implemented on a second subfolder of the active folder different from the first subfolder, the third activity being different from the first activity, wherein the first subfolder is associated with the first account and the second subfolder is associated with a second account different from the first account, wherein responsive to a determination that the first activity has been implemented on a file in the first subfolder the method includes automatically sending the file to the first account, and wherein responsive to a determination that the third activity has been implemented on a file in the second subfolder the method includes automatically sending the file to the second account.

7. The method of claim 6, wherein the first and second accounts are email accounts.

8. A system, comprising:
one or more processors;
a memory accessible by at least one of the processors; and
a set of instructions stored in the memory and executable by at least one of the processors to:
monitor activity at an active folder;
responsive to a determination that a first activity has been executed on at least one file in the active folder, automatically transmit data associated with the file to an account associated with the active folder, wherein the data indicates that the first activity has been executed, the first activity being selected from the group consisting of: a file addition to the active folder, a file deletion from the active folder, a file access in the active folder, a file rename in the active folder, or a file modification in the active folder;
responsive to a determination that a second activity different from the first activity has been executed on a file in the active folder, not transmit the data to the account, the second activity being selected from the group consisting of: a file addition to the active folder, a file deletion from the active folder, a file access in the active folder, a file rename in the active folder, or a file modification in the active folder, provided the second activity is different from the first activity; and
responsive to the execution of at least one of the first activity and the second activity, rank plural applications associated at least with the file and allocate resources to the applications based on the rank, wherein allocation of resources to the applications based on the rank includes allocation of more resources to applications with a higher rank, and wherein allocation of more resources to applications with a higher rank includes giving the higher ranked application a higher placement in a web browser list.

9. The system of claim 8, wherein the active folder is a first active folder, and wherein the set of instructions stored in the memory are executable to monitor activity at the first active folder and at least a second active folder, and rank activity at the first and second active folders, and allocate resources to applications based on the rank, wherein the allocation of resources to the applications based on the rank includes allocation of more resources to applications associated with the active folder for which its activity has a higher rank.

10. The system of claim 8, wherein the data is a message which indicates what the first activity is.

11. The system of claim 8, wherein the data is the file.

12. The system of claim 8, wherein the account is an email account, and wherein the set of instructions stored in the memory are further executable to transmit the notification to the email account, the data including a selectable link to the file.

13. The system of claim 8, wherein the set of instructions stored in the memory are executable to store information associated with the notification in a log, the information including at least a transmission status of the data.

14. The system of claim 13, wherein the transmission status is that the data was transmitted.

15. A computer program product comprising a computer readable storage medium that is not a carrier wave and that includes machine readable code embodied therein to:
monitor activity at a folder;
responsive to a determination that at least a first activity has been executed at the folder to access an existing file in the folder, automatically execute a function on the file, the first activity being selected from the group consisting of: a file addition to the folder, a file deletion from the folder, a file access in the folder, a file rename in the folder, or a file modification in the folder;
responsive to a determination that a second activity different from the first activity has been executed on a file in the folder, not automatically execute the function on the file, the second activity being selected from the group consisting of: a file addition to the folder, a file deletion from the folder, a file access in the folder, a file rename in the folder, or a file modification in the folder, provided the second activity is different from the first activity;
responsive to the execution of at least one of the first activity and the second activity, rank plural applications, and allocate resources to the applications based on the rank, wherein at least one of the applications is associated with the function, wherein allocation of resources to the applications based on the rank includes allocation of more resources to applications with a higher rank, and wherein the allocation of more resources to applications with a higher rank includes giving the higher ranked applications a higher placement in a web browser list.

16. The computer program product of claim 15, further comprising machine readable code to store the monitored activity in a log.

17. The computer program product of claim 16, wherein the log is a history of activity at the folder including execution of the function.

18. The computer program product of claim 15, wherein the function is to execute a virus scan on the file.

* * * * *